March 27, 1934. J. P. CROASDALE, JR., ET AL 1,952,585
PLANTING TOOL
Filed May 26, 1932
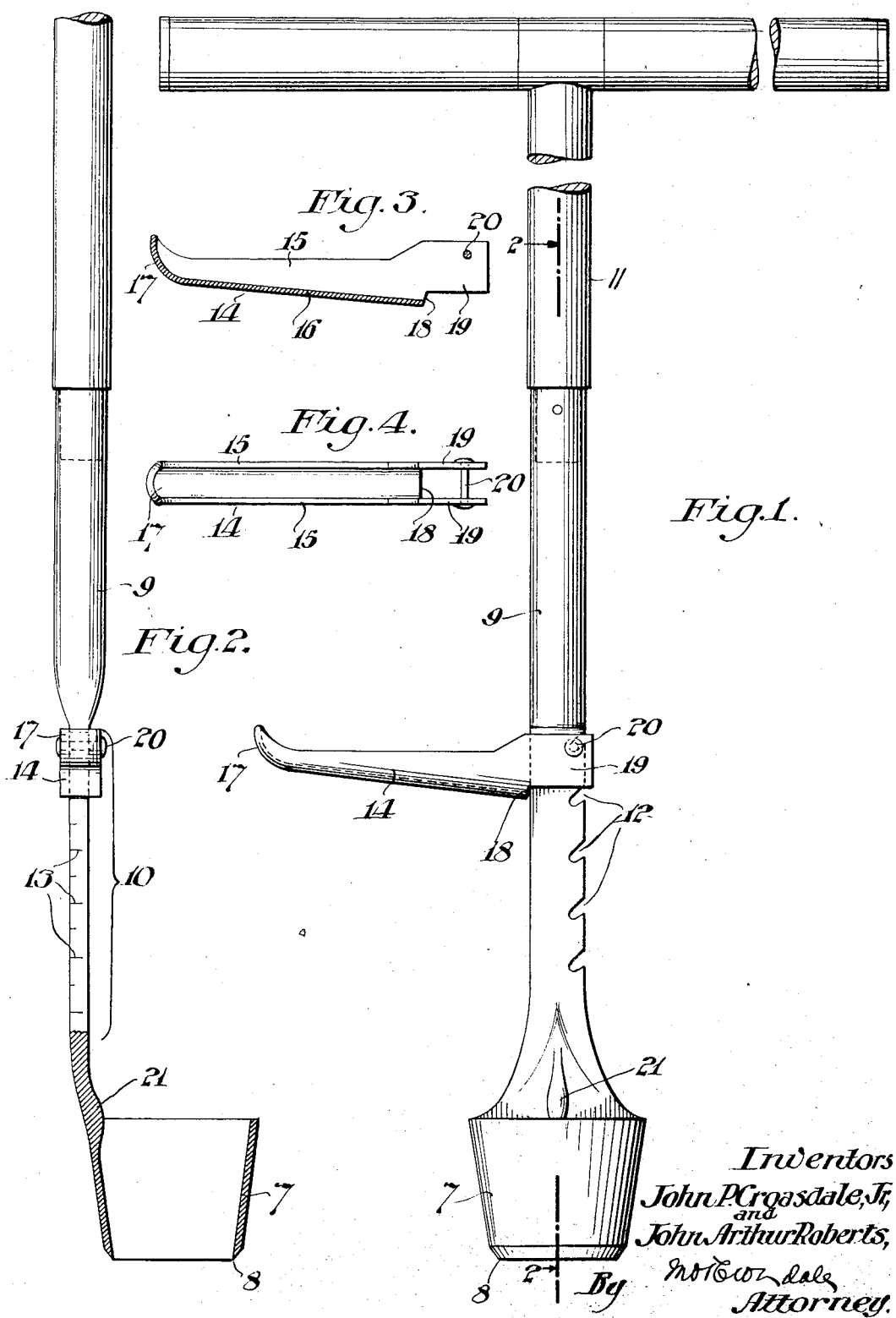
Inventors
John P. Croasdale, Jr.
and
John Arthur Roberts,
By
Attorney.

Patented Mar. 27, 1934

1,952,585

UNITED STATES PATENT OFFICE 1,952,585

PLANTING TOOL

John P. Croasdale, Jr., Berwyn, and John Arthur Roberts, Philadelphia, Pa.; said Roberts assignor to said Croasdale Application May 26, 1932, Serial No. 613,628

3 Claims. (Cl. 55—18)

The invention relates to improvements in planting tools. The object is to provide an improved device for making excavations in the earth to receive bulbs or other plant roots.

The especial object of the invention is to provide means for securing, in one operation, an excavation of required depth; which depth may be greater in some cases than in others, depending upon the nature of the plant which is to be accommodated, or the time of blooming, which is desired.

For example, it is known that tulips of the same variety will all bloom at substantially the same time, if the bulbs are all planted at the same depth and at the same time, whereas the time of blooming will not be simultaneous if the depth of planting varies substantially.

The invention also comprises means whereby the depth of the excavation may be automatically controlled, and means whereby the said controlling means may be adjusted from time to time as required.

The invention also comprises improvements in details of construction.

Referring to the drawing, which illustrates merely by way of example a suitable embodiment of the invention:—

Fig. 1 is a front elevation of a planter embodying the invention.

Fig. 2 is a side elevation, partly in section.

Fig. 3 is a sectional elevation of the adjustable foot-piece.

Fig. 4 is a top plan view of same.

Similar numerals refer to similar parts throughout the several views.

The cup-shaped formation 7 is approximately cylindrical, except that it tapers slightly from the top toward the bottom. It is open at both top and bottom, and the lower edge of its wall, as at 8, is preferably sharpened, or made thinner than the rest of the wall.

The shank 9 is secured to or made integral with, the cup 7, and extends upwardly from one side thereof. This shank is shown as provided with a straight extension 10 immediately above the cup, before the same is attached to the wood handle 11, usually provided for garden tools. This straight extension 10 is approximately seven inches long and, in the present example, is provided along one margin thereof with spaced notches 12, preferably positioned about one inch apart. Graduation marks 13 may be provided in connection with these notches, with suitable indications, to show the depth in inches or the like, to be secured by said adjustment.

The foot-piece 14 is shown in the present example as a channeled structure having the two parallel sides 15. These sides join the bottom portion 16 in an upwardly curved end 17, as to one end: while, at the other end, the bottom 16 terminates, as at 18, short of the side walls 15, thereby leaving the wings 19 adapted to flank the extension 10 of shank 9. A rivet or pin 20 extends between the wings 19, and is adapted to engage with a notch 12. When the pin 20 engages with a notch 12 the end 18 of bottom 16 engages as a fulcrum, the opposite side of the shank from the notch 12. This maintains the foot-piece at right angles to the shank 9, or in a substantially horizontal position during the operation of pushing the cup 7 into the earth.

As a detail of construction, it will be noted that the top margin of the cup 7, as to approximately one-half part thereof, is horizontal, or in a plane at right angles to its axis, while the other approximately one-half part extends upwardly above the horizontal part in a tapering formation, or with converging margins merging with the shank 10, and that the shank is provided with a portion 21 projecting beyond the plane of the inner surface of the cup and merging as to its adjacent margins, with said inner surface.

Either of these features, or both combined may be utilized in counteracting excessive stress between shank and cup, especially when the cup is being pushed into a soil that is unusually dry or stony, or for other cause present abnormal resistance to the operation of the tool. In other words, while some tools of a similar character are adapted to be used in well tilled or worked garden soil only—the tool, in accordance with the present invention, is adapted for use not only with soft or well worked soils but also with soils having resisting characteristics as above described.

It will also be understood that, while we have shown a specific embodiment of the invention merely by way of example, we do not wish to be confined to said specific construction, for example the shank and handle may vary in form, and in manner and point of engagement, without departing from the scope of the invention as defined in the claims.

In operation:—

In planting a bulb, such as a tulip bulb, the required depth for such planting being known, the cup-shaped formation is forced into the ground to the depth required. This depth may be approximated by estimating the distance the top of the cup goes below the surface of the ground, and adding thereto the depth of the cup-shaped formation. To facilitate this excavating operation and to render more certain the exact depth secured, the adjustable foot-piece is preferable, in which case the foot-piece 14 is adjusted as above described, the marks or graduations indicating the depth to which the cup 7 is to be pushed into the ground. The cup is then placed upon the spot of ground to be excavated; foot pressure is applied to the foot-piece 14 and the cup is thereby forced downwardly until the foot-piece 14 rests upon the surface of the ground. The cup is then withdrawn from the ground, and, because of its tapered formation, it brings up the earth contained within the cup and also the earth immediately above it, thus leaving a clean hole or excavation into which the bulb or root may be inserted. It should also be noted that by this operation, the earth surrounding the excavation has not been unduly compacted, which is a distinct advantage in planting roots and bulbs.

The features of this device which appear to constitute an advance in the art, are the formation of cup and means for attaching the same to the operating handle, that shall provide a maximum of strength, while presenting the least resistance to the insertion of the cup into the ground to any required depth, which may be two or more times the height of the cup, and also the means whereby this wide range of insertion may be exactly measured and controlled.

What we claim is:—

1. A planting tool, comprising a cup-shaped formation open at top and bottom and tapering toward the bottom, an integral shank projecting above the top of the cup, and an operating handle associated therewith, said shank having as to its lower extension a part thicker than the cup wall tapering downwardly into the cup and merging smoothly within the inner wall surface of the cup, said construction including an extension above the top of the cup, having a line of recesses spaced one above another, and a foot actuated element adapted to cooperate selectively with said recesses for securing a range of adjustment for said elements entirely above the top margin of the cup.

2. A planting tool, comprising a cup formation open at top and bottom and tapering from top to bottom, an operating handle therefor, a substantially vertical shank for connecting the cup to the handle, said shank having as to its lower end a part thicker than the cup wall, tapering downwardly into the cup and merging smoothly with the inner wall surface of the cup, the top margin of the cup, when in normal operating position, being in a substantially horizontal plane, except portions adjacent to and flanking the shank, which extend upwardly from said horizontal part in converging curves merging with the shank.

3. A planting tool, comprising a cup formation open at top and bottom and tapering from top to bottom, an operating handle therefor, a substantially vertical shank for connecting the cup to the handle, said shank having as to its lower end a part thicker than the cup wall, tapering downwardly into the cup and merging smoothly with the inner wall surface of the cup, and a foot-operated element associated therewith, having a range of adjustable movement entirely above the cup, the underside of said element adapted to engage the surface of the ground to limit the depth to which the cup may be pushed into the ground.

JNO. P. CROASDALE, JR.
JOHN ARTHUR ROBERTS.